United States Patent
Yoshida

(10) Patent No.: US 6,859,620 B2
(45) Date of Patent: Feb. 22, 2005

(54) RANGEFINDER APPARATUS AND CAMERA EQUIPPED THEREWITH

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/670,774

(22) Filed: Sep. 26, 2003

(65) Prior Publication Data

US 2004/0081443 A1 Apr. 29, 2004

(30) Foreign Application Priority Data

Sep. 27, 2002 (JP) ..................... P2002-284060

(51) Int. Cl.$^7$ .............................. G03B 13/36
(52) U.S. Cl. .................. 396/104; 396/121; 396/128
(58) Field of Search ........................ 396/104, 125, 396/128, 121–123; 356/3.13–3.16; 250/201.8

(56) References Cited

U.S. PATENT DOCUMENTS 5,552,853 A    9/1996  Muramatsu et al.
5,561,497 A   10/1996  Muramatsu et al.
5,563,677 A   10/1996  Muramatsu et al.
5,960,219 A *  9/1999  Kageyama et al. ......... 396/104

FOREIGN PATENT DOCUMENTS

JP              5-203870          8/1993

* cited by examiner

Primary Examiner—W. B. Perkey
(74) Attorney, Agent, or Firm—Leydig, Voit & Mayer, Ltd.

(57) ABSTRACT

A rangefinder apparatus forms an image of light from an object to be subjected to rangefinding onto a pair of line sensors, each line sensor including light-detecting elements, and generates autofocus (AF) data for computing a correlation value from signals from the light-detecting elements; acquires the AF data from a pair of employed sensor areas; determines a pair of window areas for selecting the AF data for computing a correlation value, and successively computes correlation values while shifting the pair of window areas; detects a shift of the window areas yielding the highest correlation according to the correlation values computed and calculates distance to the object according to the shift amount yielding the highest correlation; and calculates oscillation of the AF data, and disables rangefinding if the oscillation is too large.

6 Claims, 12 Drawing Sheets

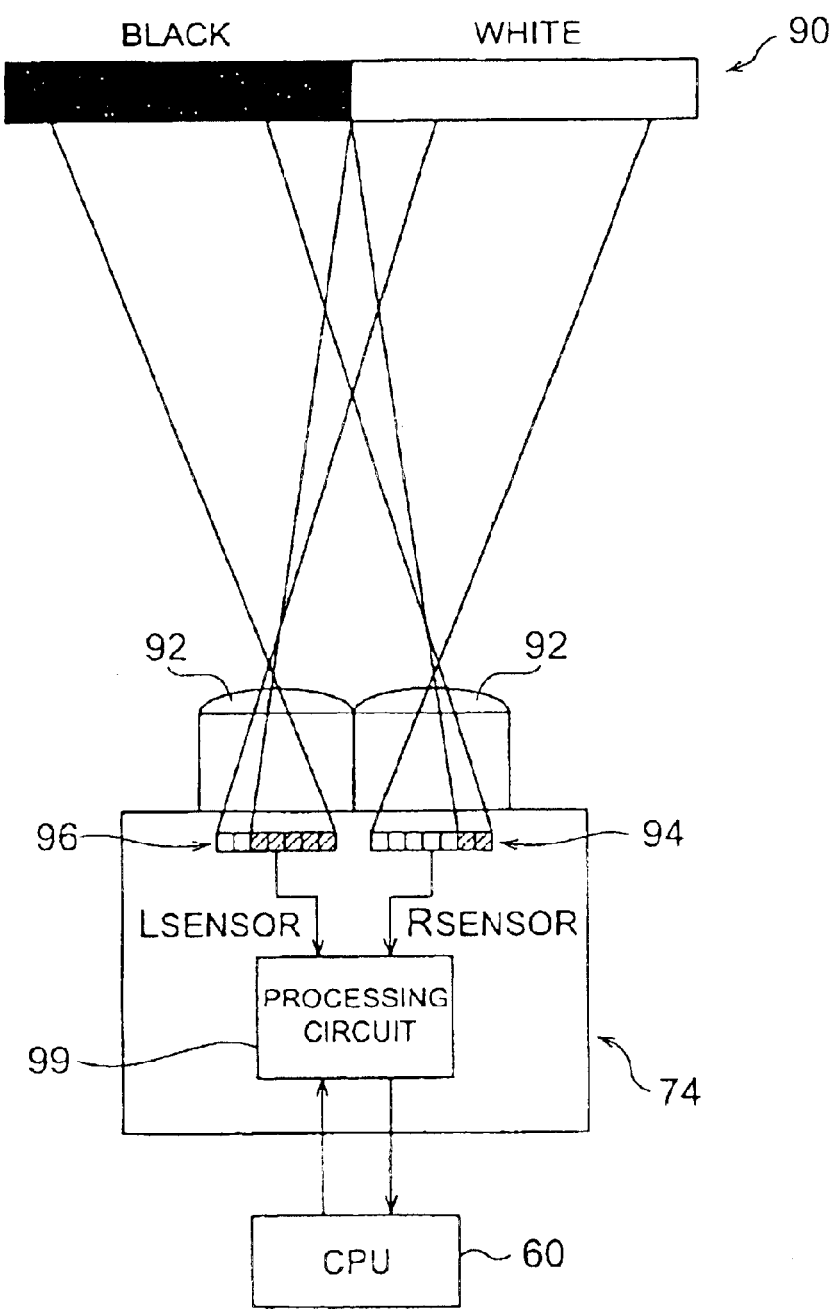

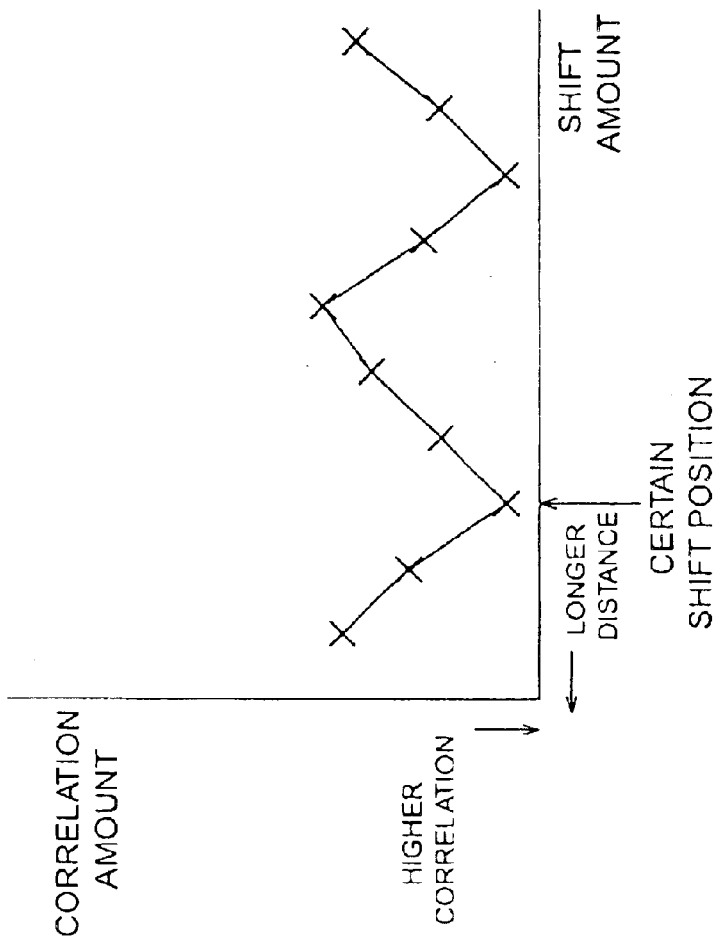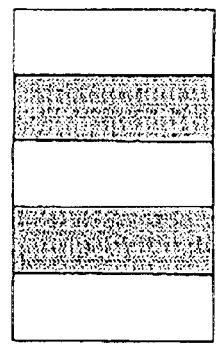

RANGEFINDER APPARATUS AND CAMERA EQUIPPED THEREWITH

BACKGROUND OF THE INVENTION

1. Field of the Invention

The present invention relates to a rangefinder apparatus and a camera equipped therewith.

2. Related Background Art

A rangefinder apparatus of a camera equipped with an AF sensor of passive type or the like captures an object by a pair of left and right line sensors, for example, so as to acquire left and right sensor images (AF data). A pair of window areas for acquiring a pair of AF data items used for correlation value computing from the AF data obtained by the pair of left and right line sensors are determined, and pairs of AF data items used for correlation value computing are acquired while shifting the pair of window areas in directions opposite from each other within a pair of predetermined sensor regions (employed sensors). Alternatively, one of the window areas is fixed, and pairs of AF data items used for correlation value computing are successively acquired while shifting the other window area. The correlation between thus obtained pair of AF data items is determined, and the object distance is calculated according to the shift amount of window areas at the time of yielding the highest correlation (at the time when the left and right sensor images in the respective employed sensors coincide with each other).

Specifically, the shift amount of window areas yielding the highest correlation is a shift amount at which the correlation value attains a minimum value. Though there may be cases where the highest correlation is obtained when the correlation value is at a maximum value depending on the method of computing correlation values, this specification explains a case where the highest correlation is obtained when the correlation value is at a minimum value. There are cases where a plurality of local minimum values exist. In such a case, the shift amount yielding the absolute minimum value is usually determined to be the shift amount with the highest correlation.

While conventional rangefinder apparatus of passive type perform correlation computing, and employ the shift amount yielding the highest correlation, a plurality of local minimum values exist in the case of an object to be subjected to rangefinding having a periodic pattern. In this case, a local minimum value other than one that should be adopted for determining the real distance to the object may be adopted. Therefore, it has conventionally been checked whether the local minimum value is reliable or not, so as not to choose the local minimum value without reliability.

For example, a rangefinder apparatus disclosed in Japanese Patent No. 3239413 checks the reliability of the local minimum value in the following way. This rangefinder apparatus starts shifting from the longer distance shift side and successively acquires correlation values. When a local minimum value appears, this rangefinder apparatus checks the reliability of the local minimum value by estimating the smallness (highness of correlation) of the local minimum value and the sharpness of the valley formed by the local minimum value. In this reliability checking process, threshold values for estimating the smallness and sharpness are varied so as to become stricter on the shorter side, thereby avoiding erroneous rangefinding which shifts to a shorter distance when measured at a longer distance.

SUMMARY OF THE INVENTION

However, the contrast values (AF data) obtained by a pair of left and right line sensors fluctuate (oscillate) intensely as shown in FIGS. 8A and 8B when an object has a repeating pattern, for example. If a correlation value is calculated according to such AF data, the correlation value heavily fluctuates with respect to the shift amount as shown in FIG. 9, thereby yielding a number of local minimum values. As a consequence, the correlation value yielding the highest correlation may be mistaken, and an object distance may erroneously be calculated.

When the determination is based on the local minimum values, it may be problematic in that the smallness of local minimum values and the sharpness of their valleys vary depending on whether the contrast of the pattern is strong or weak.

In a picture of white and gray such as the one shown in FIG. 10A, for example, local minimum values are smaller whereas the sharpness of valleys is milder as shown in FIG. 10B. In a picture of white and black such as the one shown in FIG. 11A, by contrast, local minimum values are greater whereas the sharpness of valleys is more acute as shown in FIG. 11B.

If the smallness (highness of correlation) of a local minimum value and the sharpness of the valley formed by the local minimum value with correlation values therebefore and thereafter are analyzed as in the rangefinder apparatus disclosed in the above-mentioned publication, the former picture yields a favorable (advantageous) smallness of local minimum values and a milder (disadvantageous) sharpness in valleys, whereas the latter picture yields greater (disadvantageous) local minimum values and a more acute (advantageous) sharpness in valleys, though they have the same repeating pattern.

Therefore, since the determination is not changed depending on pictures, there has been problematic in that repeating patterns cannot be determined stably. When a repeating pattern located at a shorter distance is subjected to rangefinding, for example, there is a fear of mistaking a shorter distance as a longer distance as shown in FIG. 12, since the determination condition is set stricter at shorter distance side.

The rangefinder apparatus disclosed in the above-mentioned publication detects local minimum values while carrying out correlation value computing, and then performs the above-mentioned two determinations. If the result of correlation is unfavorable, the correlation value computing is considered to have been carried out in vain, which wastes the computing time. The correlation computing necessitates a computing time as has been well-known. Therefore, unnecessary times may accumulate when calculating distances in a plurality of regions, calculating distances a plurality of times, and so forth, thereby wasting time.

For overcoming the problem mentioned above, it is an object of the present invention to provide a rangefinder apparatus which can suppress erroneous rangefinding of an object, and a camera equipped therewith.

For overcoming the above-mentioned problem, the present invention provides a rangefinder apparatus comprising AF data generating means for forming an image of light from an object to be subjected to rangefinding onto a pair of line sensors each including a plurality of light-receiving elements, and generating AF data for computing a correlation value according to signals obtained from the light-receiving elements; AF data acquiring means for acquiring the AF data from a pair of employed sensor areas used for rangefinding in the pair of line sensors; correlation value computing means for determining a pair of window areas for selecting the AF data to be used for computing a correlation value within the pair of employed sensor areas, and successively computing correlation values while shifting the pair of window areas; object distance calculating means for detecting a shift amount of the window areas yielding the highest correlation according to the correlation values computed by the correlation value computing means and calculating a distance to the object according to the shift amount yielding the highest correlation; and rangefinding incapability determining means for calculating an index value indicative of a degree of oscillation of the AF data in predetermined areas of the pair of line sensors, and determining according to the index value whether rangefinding is incapable or not.

The "AF data" in the present invention include the light intensity data obtained from respective light-receiving elements and the data obtained by processing the light intensity data. Such data processing includes contrast extraction processing that is described in detail hereinafter.

This rangefinder apparatus calculates an index value indicative of a degree of oscillation of the AF data in the predetermined areas, and determines according to this index value whether rangefinding is incapable or not. Therefore, it can suppress erroneous rangefinding by disabling the rangefinding when it is determined that oscillation of the AF data is greater according to the index value.

The rangefinding incapability determining means preferably samples AF data at a predetermined interval in the predetermined area of each line sensor, and adds respective absolute values of the differences between couples of AF data sampled at the adjacent sampling points so as to calculate a contrast integration value for each line sensor; subtracts the absolute minimum value of the AF data in the predetermined area of each line sensor from the absolute maximum value thereof so as to calculate the maximum contrast gap; and calculates a ratio between the sum of the contrast integration values for respective predetermined areas and the sum of the maximum contrast gaps for respective predetermined areas as the index value. Thus calculated ratio is favorable as an index value for determining whether the oscillation of the AF data is greater or smaller.

The present invention provides a camera comprising the above-mentioned rangefinder apparatus. Here, the camera encompasses not only still cameras such as film cameras and digital still cameras, but also video cameras and the like.

BRIEF DESCRIPTION OF THE DRAWINGS

FIG. 3 is a diagram showing the configuration of an AF sensor of passive type;

FIGS. 10A and 10B are charts for explaining a rangefinding process carried out by a conventional rangefinder apparatus;

DESCRIPTION OF THE PREFERRED EMBODIMENTS

In the following, embodiments of the present invention will be explained with reference to the accompanying drawings. In the explanation of the drawings, constituents identical to each other will be referred to with numerals identical to each other without repeating their overlapping descriptions.

Figure 1:
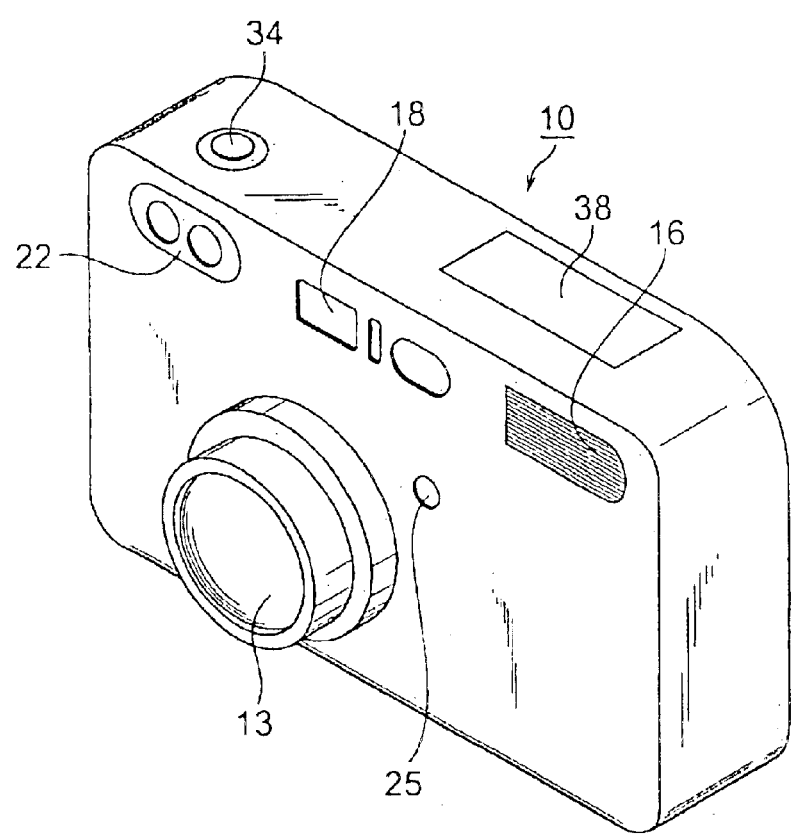
FIG. 1 is a perspective view of a camera equipped with a rangefinder apparatus in accordance with an embodiment as seen from the front side.

FIG. 1 is a perspective view showing a camera equipped with the rangefinder apparatus in accordance with an embodiment as seen from the front side. As shown in FIG. 1, this camera 10 is provided with a zoom lens barrel 13 including a taking lens for forming an object image onto a silver halide film, a flash window 16 for flashing, a finder window 18 for a photographer to see the object, an AF window 22 incorporating therein an AF sensor of passive type for measuring the object distance, a photometric window 25 incorporating therein a photometric sensor for measuring the brightness of the object, a shutter button 34 to be operated by the photographer when ordering a shutter release, and the like.

Figure 2:
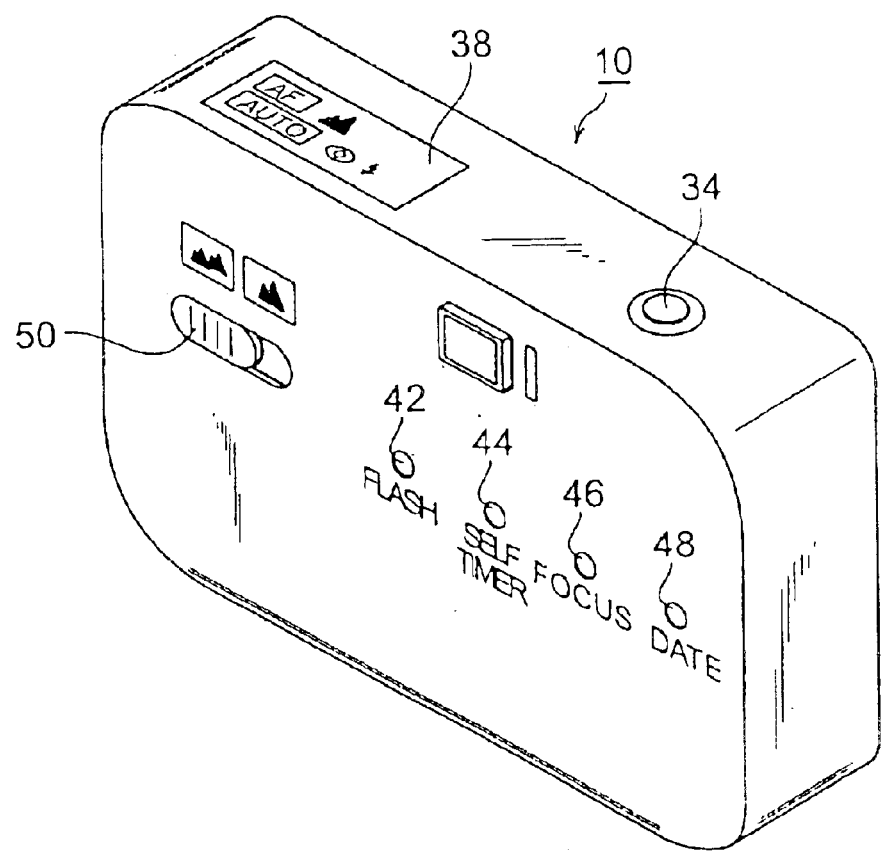
FIG. 2 is a perspective view of the camera equipped with the rangefinder apparatus in accordance with the embodiment as seen from the rear side.

FIG. 2 is a perspective view of the camera 10 as seen from the rear side. As shown in FIG. 2, the camera 10 is provided with an LCD panel 38 for displaying a taking mode which is set, date information, and the like; a flash button 42 for setting a flashing mode of the flash; a self-timer button 44 for setting a mode of a self-timer; a focus button 46 for setting a focus mode; a date button 48 for setting date and time; and a zoom button 50 for selecting the taking angle of view between wide and tele directions.

FIG. 3 is a diagram showing the configuration of the AF sensor 74 of passive type. As shown in FIG. 3, the AF sensor 74 is provided with a lenses 92 for forming an image of an object 90 onto a light-receiving surface of each of right and left sensors; an R (right) sensor 94 on the right side and an L (left) sensor 96 on the left side, each photoelectrically converting the image formed on the light-receiving surface into a luminance signal and outputting thus obtained signal; and a processing circuit 99 for exchanging various kinds of data with the CPU 60, controlling the R sensor 94 and L sensor 96, and carrying out data processing. The R sensor 94, L sensor 96, and processing circuit 99 are implemented on the same substrate.

Each of the R sensor 94 and L sensor 96 is a CMOS line sensor, for example, and is constituted by a plurality of cells (light-receiving elements) arranged on a line. Individual cells in each of the R sensor 94 and L sensor 96 are referred to with sensor numbers 1, 2, 3, . . . , 233, and 234 successively from the left side of the drawing. However, 5 cells each from the left and right ends are unused as dummy cells in practice, whereby the effective sensor region ranges from the sensor numbers 6 to 229. The individual cells of the R sensor 94 and L sensor 96 successively output to the processing circuit 99 luminance signals corresponding to their received light quantities in association with their sensor numbers.

The processing circuit 99 switches between operating and non-operating states of the AF sensor 74 according to instruction signals from the CPU 60. Upon receiving control data from the CPU 60 concerning details of an operation in the operating state, it starts processing such as integration processing according to the control data. The integration processing is an operation for integrating (adding) the respective luminous signals of cells obtained from each cell of the R sensor 94 and L sensor 96, so as to generate an integrated value of luminance signal, which represents integrated value of light quantity, for each cell.

The processing circuit 99 generates sensor data indicative of intensity of light received by each light-receiving cell. The sensor data mean a group of the integrated values of luminance signals without being substantially processed, or a group of values each determined by subtracting the integrated value of luminance signal from a predetermined reference value (reference voltage VREF). The sensor data shows a lower value as the received light has a larger quantity. However, processing of the integrated value of luminance signal is not limited to the above-mentioned method.

The CPU 60 acquires the sensor data of individual cells obtained by the integration processing from the processing circuit 99 in association with their sensor numbers. As a consequence, the CPU 60 recognizes the images (hereinafter referred to as sensor images) captured by the R sensor 94 and L sensor 96. Then, as will be explained later in detail, correlation value computing is carried out between the respective sensor images of the R sensor 94 and L sensor 96, an amount of deviation of sensor images yielding the highest correlation is determined, and the distance to the object 90 is calculated (the principle of trigonometric measurement).

Quantitatively, taking account of the gap between the R sensor 94 and L sensor 96, the distance from each sensor to the lens 92, the pitch (e.g., 12 μm) of each cell in the R sensor 94 and L sensor 96, and the like, the object distance can be calculated from the amount of deviation of sensor images. The amount of deviation of sensor images can be determined by carrying out correlation value computing between the respective sensor images of the R sensor 94 and L sensor 96.

Figure 4A:
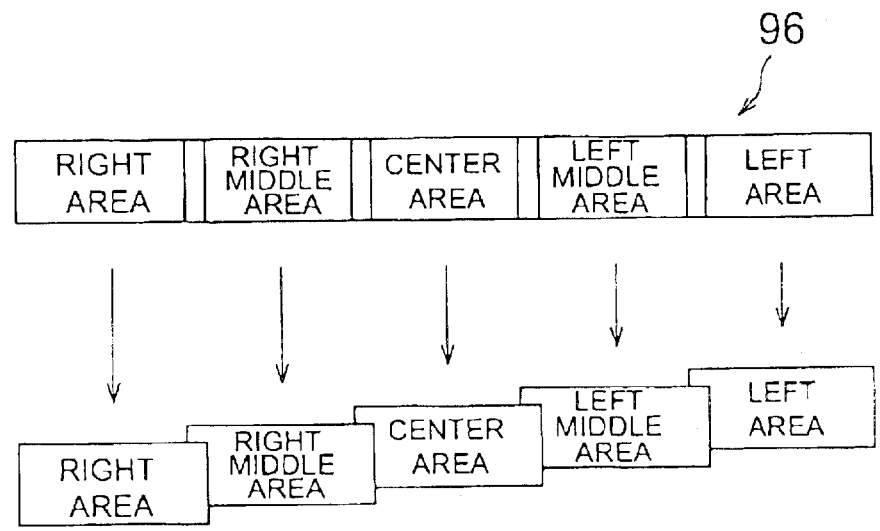
FIGS. 4A and 4B are diagrams showing divisional areas in sensor regions of R and L sensors, respectively.
Figure 4B:
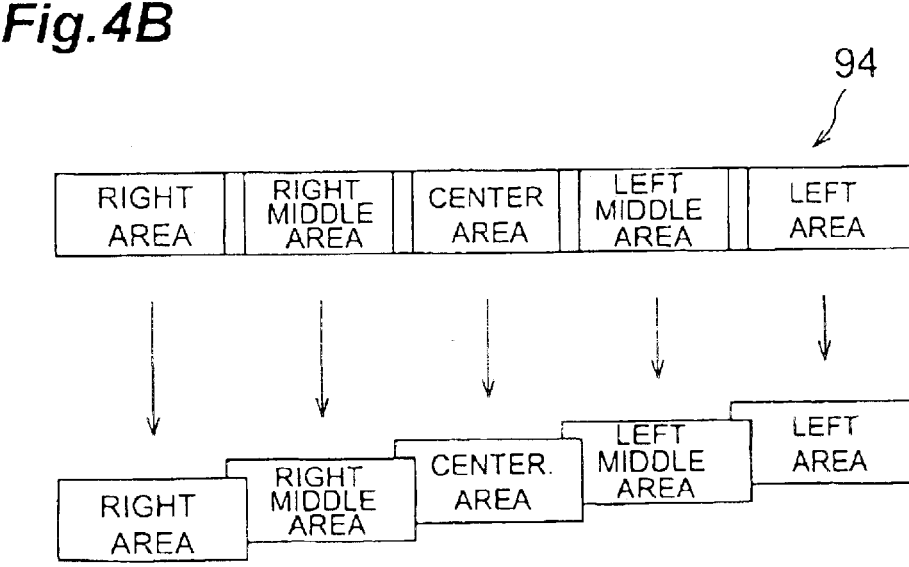

Here, as shown in FIG. 4, the sensor region of each of the R sensor 94 and L sensor 96 is divided into 5 areas in this embodiment. Letting these divided areas be referred to as divisional areas in the following, the divisional areas are constituted by "right area", "right middle area", "center area", "left middle area", and "left area" as shown in the drawing. Each divisional area shares a partial region (cell) with its neighboring divisional areas. At the time of correlation value computing and the like, correlation value computing is carried out individually between corresponding divisional areas (between divisional areas having the same name) of the R sensor 94 and L sensor 96. Though each sensor region is divided into 5 divisional areas in this embodiment, it may be divided into other numbers as well.

Figure 5:
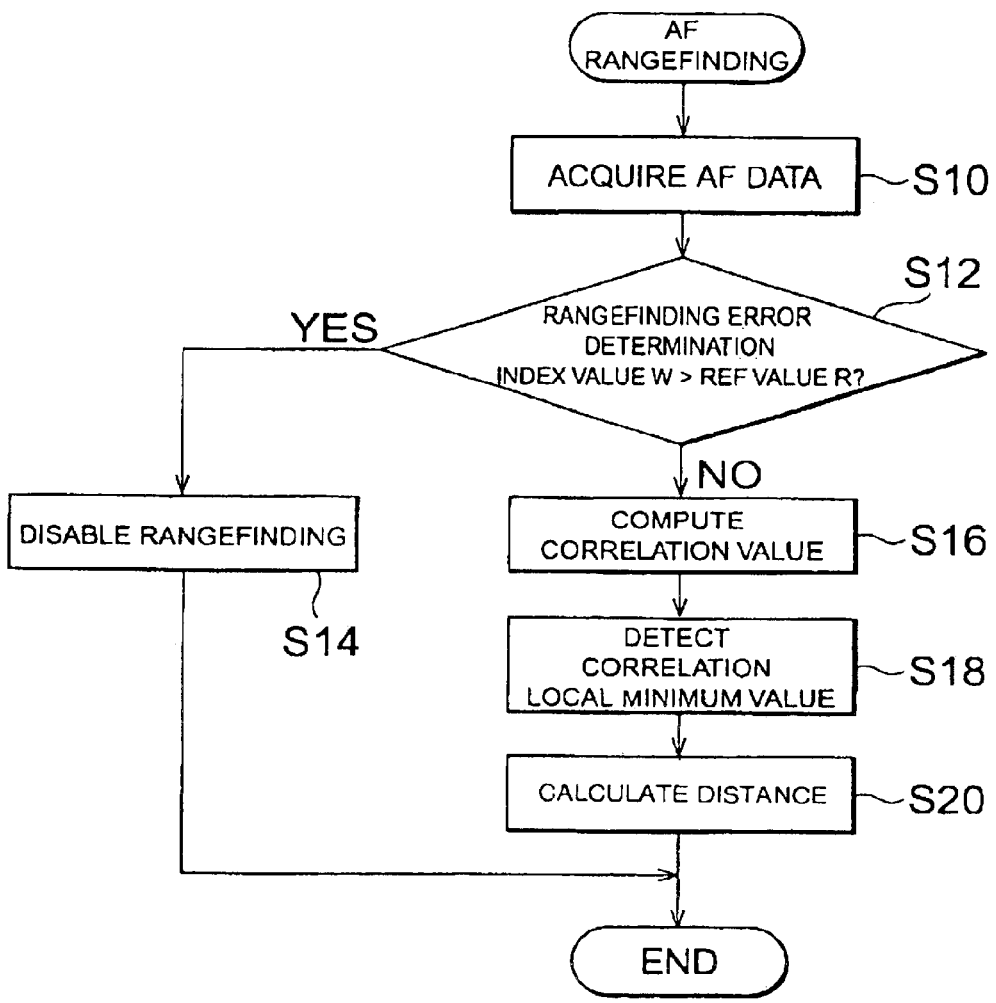
FIG. 5 is a flowchart for a process of calculating a distance.

A process of calculating the distance to the object by the CPU 60 will now be explained with reference to the flowchart of FIG. 5.

First, at step S10, the CPU 60 acquires AF data. A process of generating AF data from sensor data will now be explained. Assuming that the data outputted from the light-receiving cell of the AF sensor 74 is the sensor data as mentioned above, there seem to be two cases, i.e., a case where the individual sensor data outputted from the AF sensor 74 are acquired by an A/D converter circuit, so that thus acquired A/D-converted value of sensor data itself is employed as AF data used in each of subsequent processes in the CPU 60; and a case where sensor data subjected to a predetermined process for improving the accuracy in rangefinding is employed as AF data. In the former case, no particular processing for generating AF data is necessary in the CPU 60, whereby a process of acquiring sensor data becomes a process of acquiring AF data. In the latter case, by contrast, a specific process is carried out for generating AF data in the CPU 60 after the sensor data is acquired. For example, in the latter case, sensor data subjected to contrast extraction can be used as AF data used in each of the subsequent processes. The processing in the case where AF data is generated by subjecting sensor data to contrast extraction so as to generate AF data will now be explained.

The contrast extraction process is an arithmetic operation for calculating the difference between the sensor data of a cell having a cell number i and the sensor data of another cell having a sensor number (i+m) separated from the former cell by m cells (m pixels). In other words, it is a process for calculating the difference between each of the respective sensor data items obtained from the R sensor 94 and L sensor 96 and the sensor data shifted therefrom by m pixels. Namely, letting R(i) be the sensor data of a cell having a sensor number (i) in the R sensor 94, and L(i) be the sensor data of a cell having a sensor number (i) in the L sensor 96, an arithmetic operation of the following expression:

$$R(i)-R(i+m) \qquad (1)$$

is carried out for the sensor data of R sensor 94, whereas an arithmetic operation of the following expression:

$$L(i)-L(i+m) \qquad (2)$$

is carried out for the sensor data of L sensor 96. Thus obtained differential data indicates the contrast of the sensor image captured by the AF sensor 74. In this specification, the arithmetic operation for calculating data indicative of the contrast by the sensor data difference of two pixels will be referred to as two-pixel differential operation.

The cell gap m of two sensor data items yielding a difference can be set to a desirable set value, particularly m=2 in the following explanation. Since the electric charge accumulated in a cell having an even sensor number and the electric charge accumulated in a cell having an odd sensor number in the AF sensor 74 are transmitted through respective channels different from each other so as to be processed, it is preferred that the differential data be determined from the sensor data of cells in the same channel, and m is desirably an even number. Though the number of data items determined by the above-mentioned expressions (1) and (2) decreases by m as compared with that obtained from the AF sensor 74 in the CPU 60, a necessary number of AF data items can be secured if the data acquiring range is expanded beforehand in view of the decrease by m.

Though the differential data obtained by the above-mentioned expressions (1) and (2) have conventionally been employed as AF data, the differential data having +128 further added thereto are employed as AF data in this embodiment. Namely, letting AFR(i) be the AF data corresponding to the sensor number i of the R sensor 94, and AFL(i) be the AF data corresponding to the sensor number i of the L sensor 96, values obtained by the following expressions:

$$AFR(i)=(128+R(i-1)-R(i+1)) \qquad (3a)$$

$$AFL(i)=(128+L(i-1)-L(i+1)) \qquad (3b)$$

are employed as AF data when m+2.

Figure 8A:
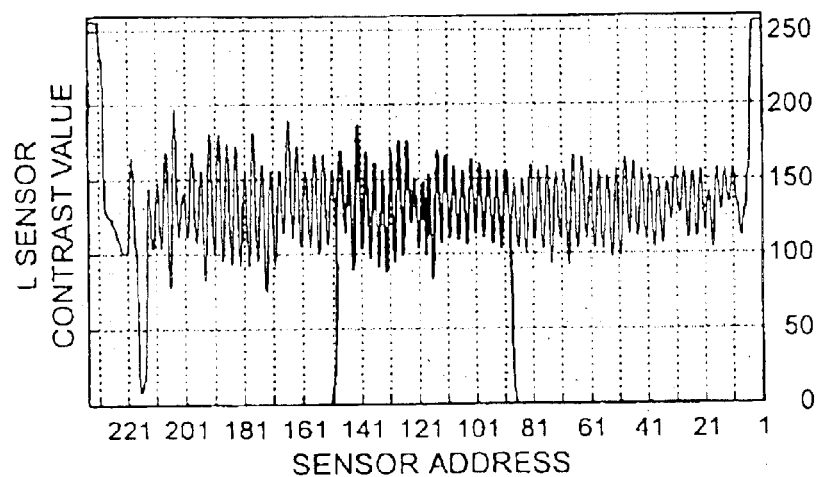
FIGS. 8A and 8B are charts showing a specific example of sensor data.
Figure 8B:
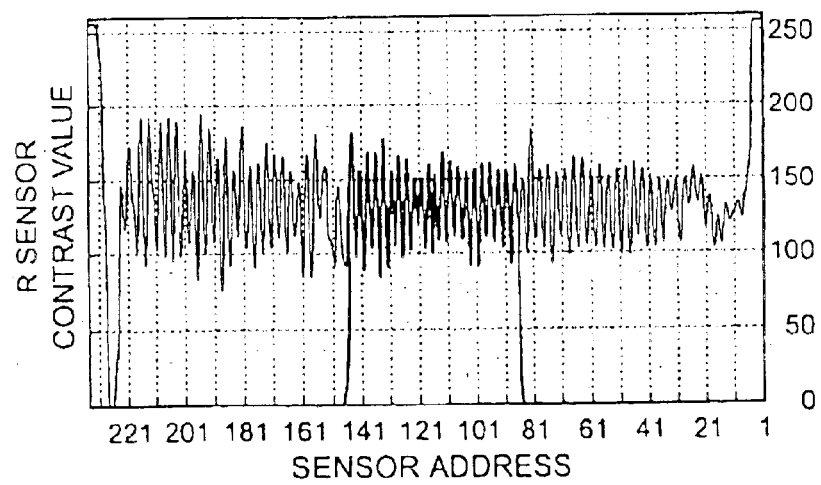

Subsequently, at step S12, the CPU 60 calculates an index value W indicative of a degree of oscillation of the contrast values (AF data) in each pair of divisional areas of the R sensor 94 and L sensor 96, and determines according to this index value W whether rangefinding is disable or not. Here, when the contrast values oscillate intensely as shown in FIGS. 8A and 8B, the correlation values computed according thereto also oscillate heavily, thereby generating a number of local minimum values. This makes it more likely to choose a wrong correlation local minimum value as one yielding the highest correlation, thereby generating erroneous rangefinding. Therefore, when the index value W is greater than a reference value R, it is determined that the degree of contrast oscillation is high, so that the flow proceeds to step S14, at which the rangefinding is judged to be incapable, so as to terminate the distance measurement, whereby erroneous rangefinding is prevented from occurring. When the index value W is not greater than the reference value R, it is determined that the degree of contrast oscillation is low, so that the flow proceeds to step S16. This processing will be explained later in detail.

At step S16, the CPU 60 calculates a correlation value f(n) (n=−2, −1, 0, 1, ..., MAX (=38)) according to the AF data acquired by the AF data acquiring process of step S10 in each pair of the divisional areas constituting the rangefinding areas of R sensor 94 and L sensor 96 of AF sensor 74.

In the calculation of correlation value, correlation value computing is carried out between respective AF data items taken from the R sensor 94 and L sensor 96 of AF sensor 74, and the amount of deviation between sensor images (shift amount between the right and left AF data) yielding the highest correlation is determined. The distance to the object can be determined from the shift amount between the right and left AF data.

In this embodiment, since 5 divisional areas are set, correlation value computing is carried out in each pair of the divisional areas of right area, right middle area, center area, left middle area, and left area.

Figure 6:
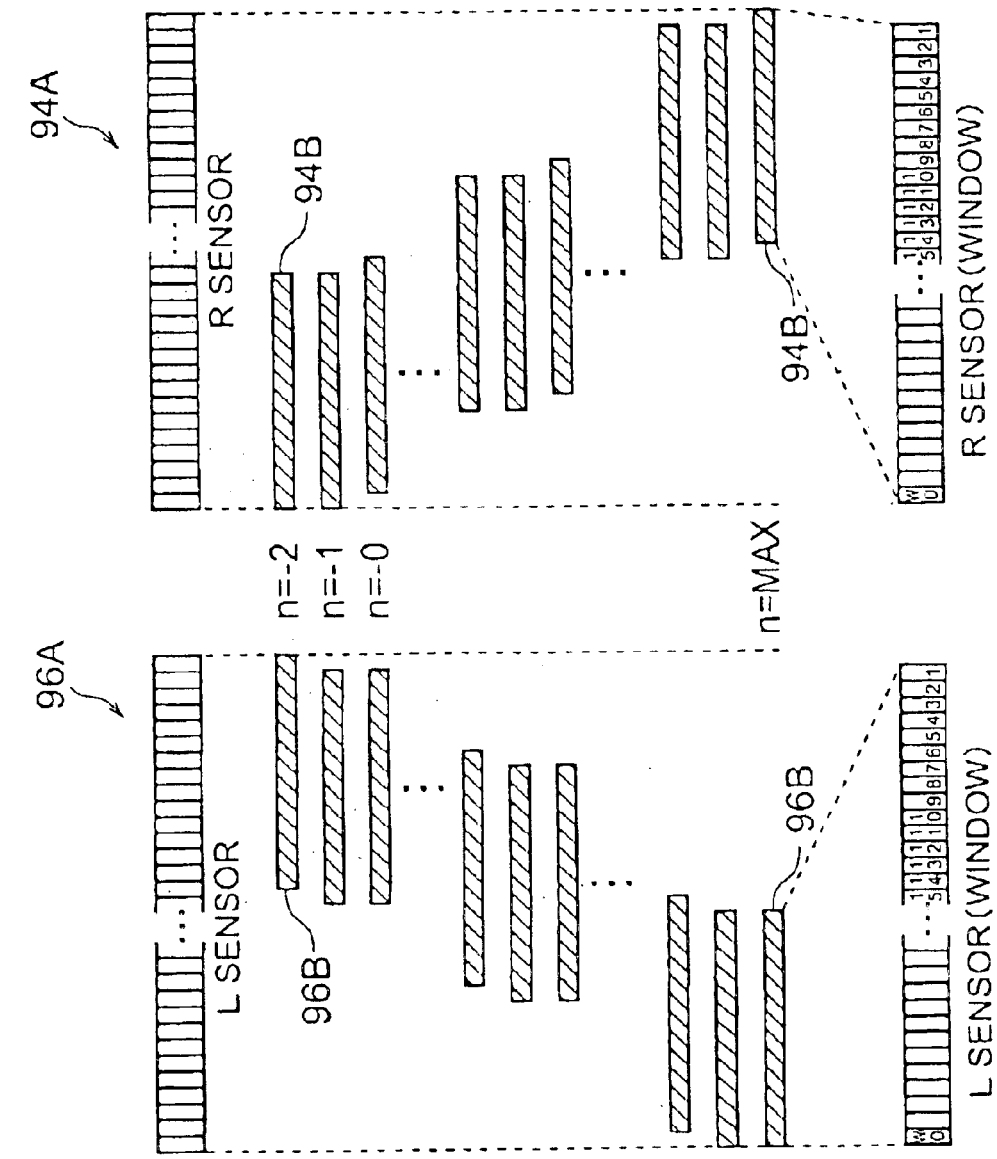
FIG. 6 is a diagram for explaining correlation value computing.

In FIG. 6, 94A and 96A are sensors in certain divisional areas (hereinafter referred to as "employed sensors") in the R sensor 94 and L sensor 96, respectively. On the other hand, 94B and 96B are R and L windows for extracting AF data used for correlation value computing from AF data of the employed sensors 94A and 96A, respectively. In the present invention the "window area" or simply the "window" means an area of each employed sensor corresponding to a row of the predetermined number (in this embodiment, such number is represented by "wo") of light-receiving elements that belong to the employed sensor.

Letting n (n=−2, −1, 0, 1, ..., MAX (=38)) be the amount of shift between the R window 94B and L window 96B, when n=−2, the R window 94B is positioned at the left end of the employed sensor 94A whereas the L window 96B is positioned at the right end of the employed sensor 96A. When n=−1, the L window 96B shifts leftward by 1 cell from the right end of the employed sensor 96A. When n=0, the R window 94B shifts rightward by 1 cell from the left end of the employed sensor 94A. Similarly, the R window 94B and L window 96B alternately move by 1 cell each time n increases by 1. When n=MAX, the R window 94B is positioned at the right end of the employed sensor 94A whereas the L window 96B is positioned at the left end of the employed sensor 96A.

Letting f(n) be the correlation value at a certain shift amount n between the R window 94B and L window 96B, the correlation value f(n) can be represented by the following expression:

$$f(n) = \sum_{i=1}^{wo} |AFL(i) - AFR(i)| \qquad (4)$$

where i is the number indicating the position of cell within a window (i=1, 2, ..., wo (=42)), and AFR(i) and AFL(i) are AF data obtained from the respective cells at the same cell position i of the R window 94B and L window 96B. Namely, as shown in expression (4), the correlation value f(n) is the sum of absolute values of differences in AF data obtained from the cells at the same cell positions of R window 94B and L window 96B, and is closer to zero as the correlation is higher.

Therefore, when the correlation value f(n) is determined while changing the shift amount n, the distance to the object can be determined from the shift amount n minimizing the correlation value f(n) (yielding the highest correlation). Here, object images are formed on the R sensor 94 and L sensor 96 such that the correlation is the highest when the shift amount n=0 in the case where the object is at infinity, and when the shift amount n=MAX in the case where the object distance is at the near end. Not only the above-mentioned expression (4) but also other arithmetic expressions can be used as an arithmetic expression for determining the correlation. In the latter case, the correlation value may become greater as the correlation is higher. In such a case, the magnitude relation concerning correlation values in the subsequent explanation is reversed. For example, the correlation value yielding the highest correlation becomes the maximum value, whereas statements such as small or large can be employed after being reversed to those of large or small.

Subsequently, at step S18, the CPU detects a local minimum value from the correlation value determined at step S16. In the detection of local minimum value, the determination of f(n−1)≧f(n)<f(n+1) is carried out. If only one local minimum value is detected, this local minimum value is adopted for distance measurement. If a plurality of local minimum values are detected, the smallest of local minimum values is detected as the absolute minimum value.

Next, at step S20, a shift amount yielding the local minimum value detected at step S18 is taken as the highest correlation shift amount exhibiting the highest correlation. Thus detected highest correlation shift amount is converted into a distance while taking account of the temperature of outside air and the like, and thus obtained distance is taken as the final distance to the object.

The above-mentioned AF rangefinding has a characteristic feature in the rangefinding incapability determining process explained at step S12. Namely, at step S12, the index value W indicative of a degree of oscillation of AF data in each pair of divisional areas is calculated. For calculating the index value W, the following equation (5) is used:

$$W = (C1L + C1R) / \Delta CONT \qquad (5)$$

In equation (5), C1L is represented by $$C1L = \sum_{i=1}^{S} |AFL(i) - AFL(i-1)| \qquad (6)$$

where AFL(i) is the i-th data item among AF data items sampled at a predetermined interval within an L employed sensor (an employed sensor in the L sensor 96). Therefore, C1L indicates the sum of absolute values of differences between couples of AF data at the sampling points adjacent to each other within the L employed sensor. Here, S is the total number of sampled AF data items in the L employed sensor.

On the other hand, in equation(5), C1R is represented by $$C1R = \sum_{i=1}^{S} |AFR(i) - AFR(i-1)| \quad (7)$$

where AFR(i) is the i-th data item among AF data items sampled at a predetermined interval within an R employed sensor (an employed sensor in the R sensor 94). Therefore, C1R indicates the sum of absolute values of differences between couples of AF data at the sampling points adjacent to each other within the R employed sensor. Here, S is the total number of sampled AF data items in the R employed sensor.

In equation (5), ΔCONT is represented by

ΔCONT=(AFRMAX−AFRMIN)+(AFLMAX−AFLMIN). (8)

In equation (8), AFRMAX and AFRMIN are the absolute maximum value and absolute minimum value of AF data in the R employed sensor, respectively. Similarly, AFLMAX and AFLMIN are the absolute maximum value and absolute minimum value of AF data in the L employed sensor, respectively.

When the index value W is calculated according to the above-mentioned equation (5), and then is greater than the predetermined reference value R, it is determined that the degree of oscillation of AF data is so large that the fear of generating erroneous rangefinding is high, whereby the flow proceeds to step S14, at which rangefinding is judged to be incapable, so as not to carry out subsequent distance calculation.

When the index value W is not greater than the reference value R, it is determined that the degree of oscillation of AF data is so small that the fear of generating erroneous rangefinding is low, whereby the flow proceeds to step S16, so as to continue subsequent processes.

Figure 7:
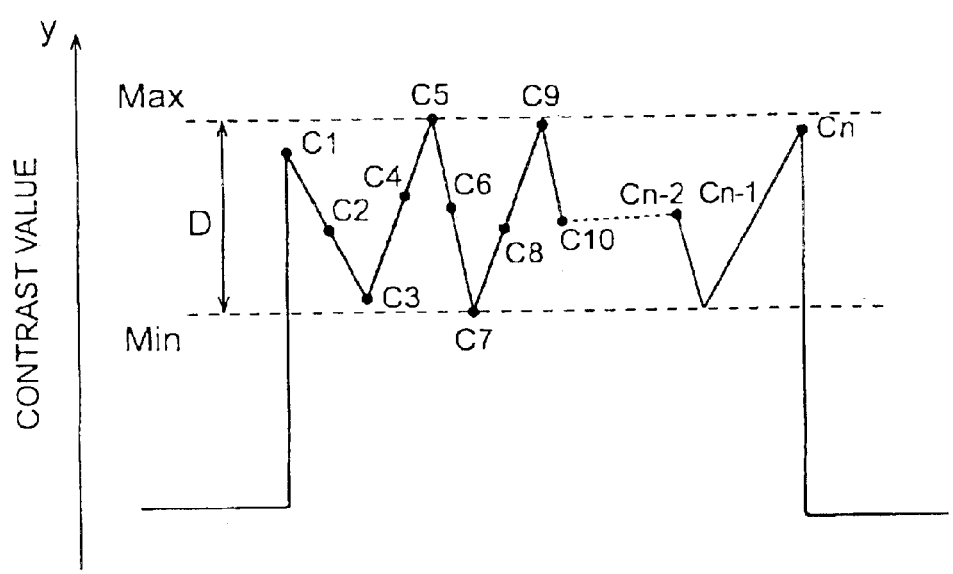
FIG. 7 is a chart for explaining the meaning of index value W.

The meaning of the index value W calculated by the above-mentioned equation (5) will now be explained with reference to FIG. 7.

C1L and C1R calculated by the equation (6) and (7) are indicative of the cumulative fluctuation amount of sampled AF data $C_1$ to $C_n$, i.e., total fluctuation amount in the y-axis direction of the sampled AF data. On the other hand, (AFRMAX−AFRMIN) and (AFLMAX−AFLMIN) indicate the amplitude of oscillation of the sampled AF data, which is represented by D in FIG. 7. Therefore, the index value W calculated by equation (5) approximates to the number of oscillation of fluctuating AF data values.

There is not limitation to the interval of sampling AFL (i) and AFR (i). AFL (i) and AFR (i) may be picked up from every light-receiving cell in the L employed sensor and R employed sensor. Narrower sampling interval is more preferable since the accuracy in index value W becomes higher.

Figure 9:
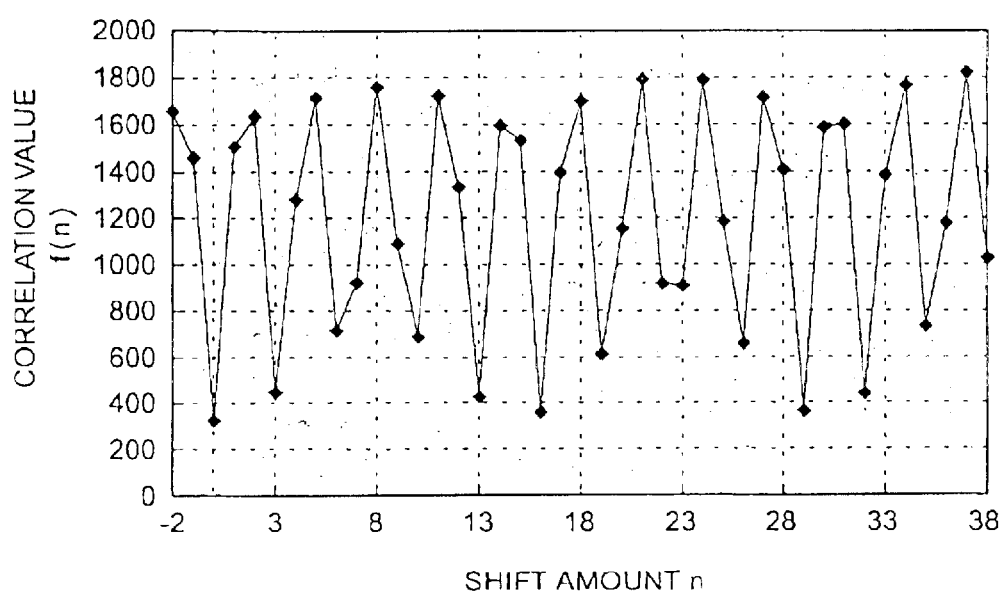
FIG. 9 is a chart showing the relationship between the correlation value and shift amount computed according to the sensor data shown in FIGS. 8A and 8B.
Figure 11A:
FIGS. 11A and 11B are charts for explaining a rangefinding process carried out by the conventional rangefinder apparatus.
Figure 11B:
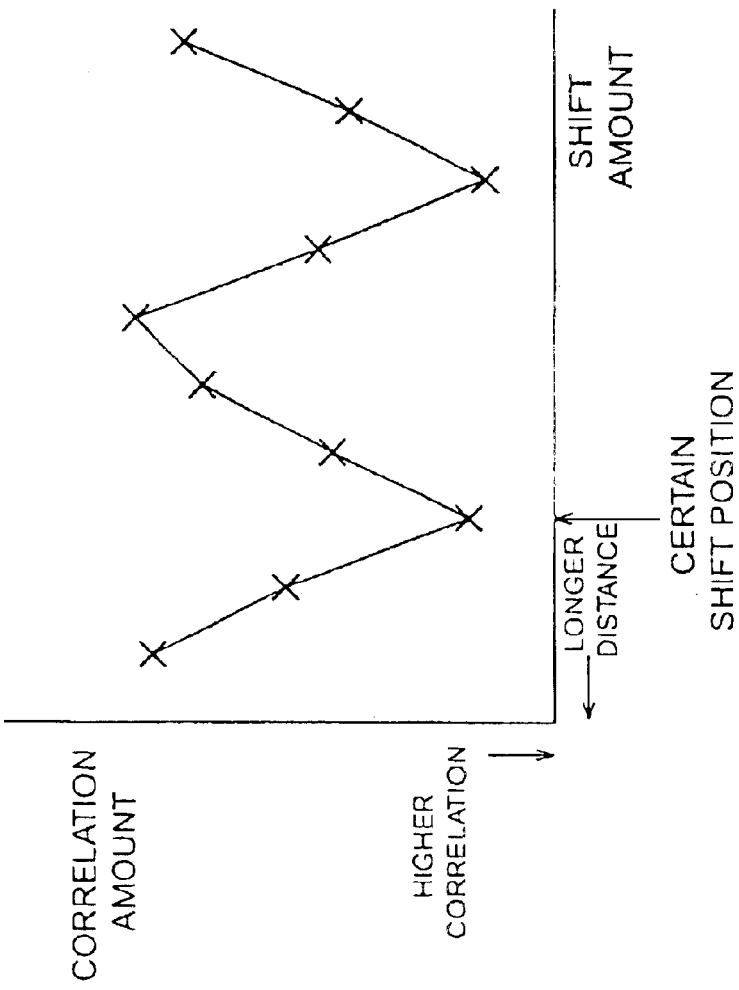
Figure 12:
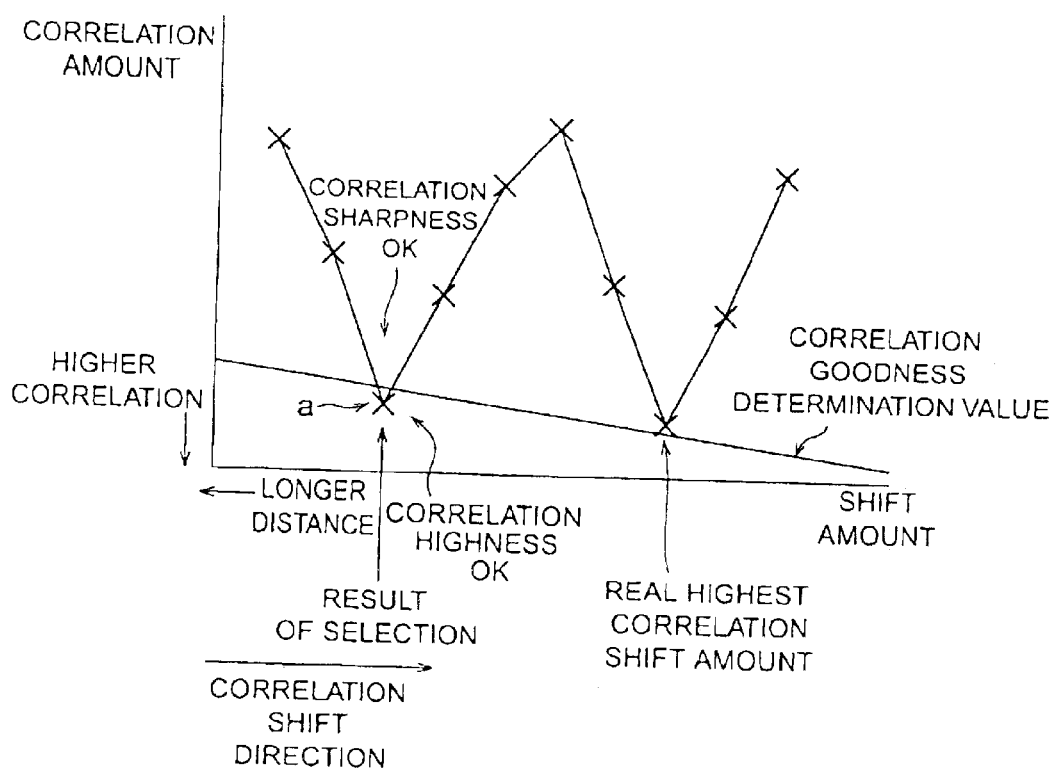
FIG. 12 is a chart for explaining a rangefinding process carried out by the conventional rangefinder apparatus.

Now, with reference to FIGS. 8A, 8B and 9, the determination of whether rangefinding is incapable or not according to the index value W at step S12 will be explained in view of a specific example.

FIG. 8A shows L sensor output when light from a certain object is received by the AF sensor 74. And FIG. 8B shows R sensor output in the same example. FIG. 9 is a graph showing the correlation values at the time when such sensor outputs are obtained.

In the case shown in FIGS. 8A and 8B, within the employed sensor range indicated by solid line, C1L represented by the above-mentioned equation (6) is 2213 whereas C1R represented by the above-mentioned equation (7) is 2166. On the other hand, (AFLMAX−AFLMIN) indicating the maximum contrast gap in the L sensor 96 is 90 whereas (AFRMAX−AFRMIN) indicating the maximum contrast gap in the R sensor 96 is 95, whereby ΔCONT represented by the above-mentioned equation (8) is 185. Therefore, from equation (5), the index value W is determined to be 23.670.

If the reference value R for determining the index value W is set to 20, for example, it is determined in the case shown in FIGS. 8A and 8B that, since the index value W is greater than the reference value R, the degree of oscillation is so large that erroneous rangefinding is likely to occur. Therefore, the flow proceeds to step S14, at which the rangefinding is judged to be incapable, so as not to carry out subsequent distance calculation. The above-mentioned reference value R can be determined according to data obtained beforehand by experiments.

Thus, when the index value W indicative of the degree of oscillation of AF data is large, the fear of generating erroneous rangefinding is high, whereby the rangefinding is disabled beforehand, which makes it possible to restrain erroneous rangefinding from occurring. Further, by avoiding subsequent processes such as correlation value computing when the rangefinding is judged to be incapable beforehand as such, useless arithmetic operations can be saved, so as to shorten the rangefinding time.

Without being restricted to the above-mentioned embodiment, the present invention can be modified in various manners. For example, though the above-mentioned embodiment employs the present invention in a so-called silver-halide camera, it is also applicable to digital still cameras, video cameras, and the like. It can be employed not only in cameras but also in vehicle-to-vehicle distance measuring apparatus and the like.

What is claimed is:

1. A rangefinder apparatus comprising:

autofocus (AF) data generating means for forming an image of light from an object to be subjected to rangefinding onto a pair of line sensors, each line sensor including a plurality of light-detecting elements, and generating AF data for computing a correlation value according to signals obtained from the light-detecting elements;

AF data acquiring means for acquiring the AF data from a pair of employed sensor areas used for rangefinding in the pair of line sensors;

correlation value computing means for determining a pair of window areas for selecting the AF data to be used for computing a correlation value within the pair of employed sensor areas, and successively computing correlation values while shifting the pair of window areas;

object distance calculating means for detecting a shift amount of the window areas yielding highest correlation according to the correlation values computed by the correlation value computing means and calculating distance to the object according to the shift amount yielding the highest correlation; and rangefinding incapability determining means for calculating an index value indicative of a degree of oscillation of the AF data in predetermined areas of the pair of line sensors, and determining that the rangefinder apparatus in incapable of rangefinding when the index value is larger than a reference value.

2. A rangefinder apparatus according to claim 1, wherein the rangefinding incapability determining means samples AF data at a predetermined interval in a predetermined area of each line sensor, and adds respective absolute values of the differences between couples of AF data sampled at the sampling points adjacent to each other to calculate a contrast integration value for each line sensor;

subtracts the absolute minimum value of the AF data in the predetermined area of each line sensor from the absolute maximum value of the AF data in the predetermined area of each line sensor to calculate maximum contrast gap; and calculates a ratio between the sum of the contrast integration values for respective predetermined areas and the sum of the maximum contrast gaps for respective predetermined areas as the index value.

3. A camera comprising the rangefinder apparatus according to claim 1.

4. A camera comprising the rangefinder apparatus according to claim 2.

5. A rangefinder apparatus comprising:

autofocus (AF) data generating means for forming an image of light from an object to be subjected to rangefinding onto a pair of line sensors, each line sensor including a plurality of light-detecting elements, and generating AF data for computing a correlation value according to signals obtained from the light-detecting elements;

AF data acquiring means for acquiring the AF data from a pair of employed sensor areas used for rangefinding in the pair of line sensors;

correlation value computing means for determining a pair of window areas for selecting the AF data to be used for computing a correlation value within the pair of employed sensor areas, and successively computing correlation values while shifting the pair of window areas;

object distance calculating means for detecting a shift amount of the window areas yielding highest correlation according to the correlation values computed by the correlation value computing means and calculating distance to the object according to the shift amount yielding the highest correlation; and rangefinding incapability determining means for calculating an index value indicative of a degree of oscillation of the AF data in predetermined areas of the pair of line sensors, and determining, according to the index value, whether rangefinding is possible, wherein the rangefinding incapability determining means samples AF data at a predetermined interval in a predetermined area of each line sensor, and adds respective absolute values of the differences between couples of AF data sampled at the sampling points adjacent to each other to calculate a contrast integration value for each line sensor;

subtracts the absolute minimum value of the AF data in the predetermined area of each line sensor from the absolute maximum value of the AF data in the predetermined area of each line sensor to calculate maximum contrast gap; and calculates a ratio between the sum of the contrast integration values for respective predetermined areas and the sum of the maximum contrast gaps for respective predetermined areas as the index values.

6. A camera comprising the rangefinder apparatus according to claim 5.

* * * * *